(12) United States Patent
Jensen

(10) Patent No.: US 6,935,069 B1
(45) Date of Patent: Aug. 30, 2005

(54) FISHING LINE CARRIER DEVICE FOR DOWNRIGGER FISHING

(76) Inventor: John J. Jensen, 6770 Superstition View Dr., Apache Junction, AZ (US) 85219

( * ) Notice: Subject to any disclaimer, the term of this patent is extended or adjusted under 35 U.S.C. 154(b) by 0 days.

(21) Appl. No.: 10/794,645

(22) Filed: Mar. 5, 2004

Related U.S. Application Data

(63) Continuation-in-part of application No. 10/754,165, filed on Jan. 9, 2004, now abandoned.

(51) Int. Cl.$^7$ .............................................. A01K 83/00
(52) U.S. Cl. ..................................................... 43/43.12
(58) Field of Search ........................... 43/43.12, 42.06, 43/42.12, 44.99

(56) References Cited

U.S. PATENT DOCUMENTS

| | | | |
|---|---|---|---|
| 2,230,751 A * | 2/1941 | Johnson | 43/43.12 |
| 3,408,701 A * | 11/1968 | Decker | 24/600.9 |
| 3,738,047 A | 6/1973 | Tozer | |
| 4,212,127 A * | 7/1980 | Daniels | 43/43.12 |
| 4,494,334 A | 1/1985 | Porter | |
| 4,750,288 A | 6/1988 | Brennan | |
| 4,866,874 A * | 9/1989 | Dudley | 43/41.2 |
| 4,945,670 A * | 8/1990 | Wetherald | 43/43.12 |
| 5,033,226 A * | 7/1991 | Jackson | 43/43.12 |
| 5,157,860 A * | 10/1992 | Clark | 43/44.9 |
| 5,337,510 A * | 8/1994 | McCue | 43/43.12 |
| 6,018,903 A * | 2/2000 | Miralles | 43/43.12 |
| 6,640,487 B2 * | 11/2003 | Angwin | 43/43.12 |

FOREIGN PATENT DOCUMENTS

FR 2613905 A1 * 10/1988 ......... A01K 91/08

* cited by examiner

Primary Examiner—Kurt Rowan
(74) Attorney, Agent, or Firm—Robert E. Howard

(57) ABSTRACT

A fishing line carrier device for use in downrigger fishing. The device includes a main body portion. A bow extends from the front of the main body portion. A tail extends from the rear of the main body portion and includes a vertical stabilizer and a horizontal stabilizer. The horizontal stabilizer has a flap extending downwardly from its trailing edge. A vertically disposed central plane extends from the bow to the tail. A bore extends vertically through the main body portion along the central plane. A diagonally extending access slot extends from the outer surface of the body to the central plane. Upper and lower access slots communicate the diagonally extending access slot with the bore. A locking pin receiving tunnel extends along the diagonally extending access slot and is adapted to receive a locking pin after the carrier device is positioned onto a downrigger line.

18 Claims, 4 Drawing Sheets

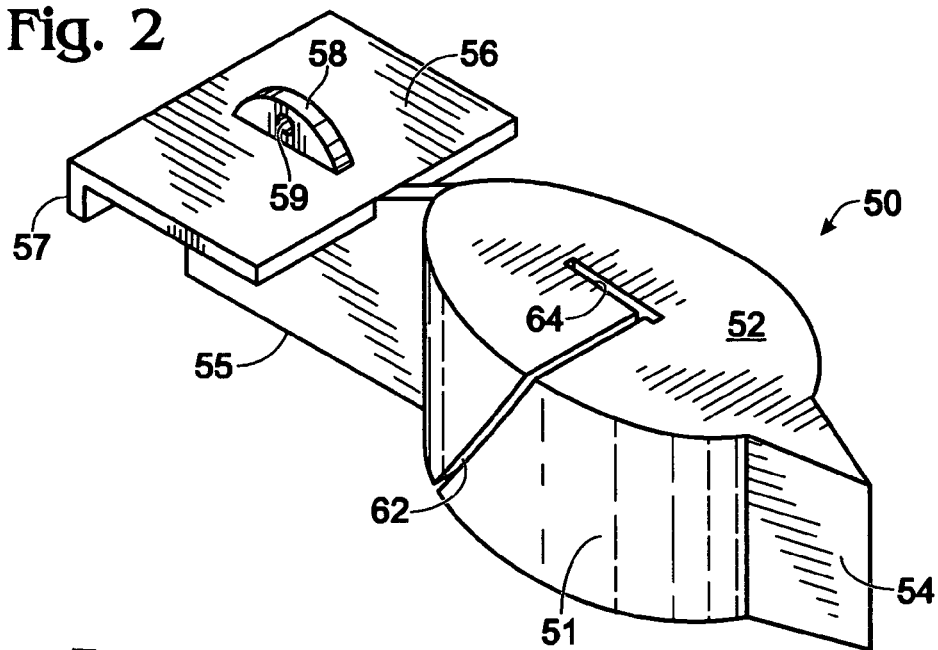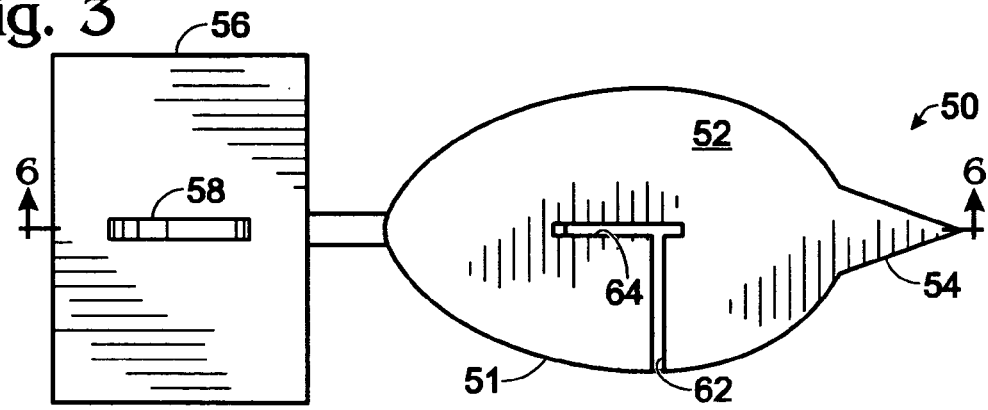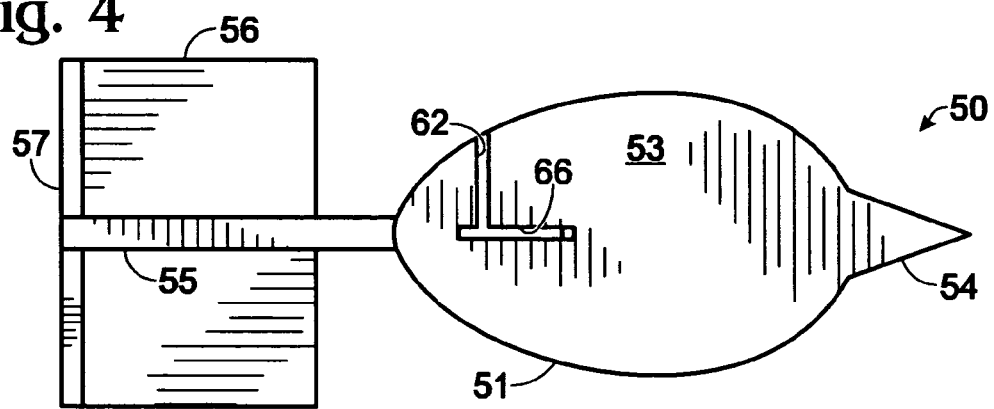

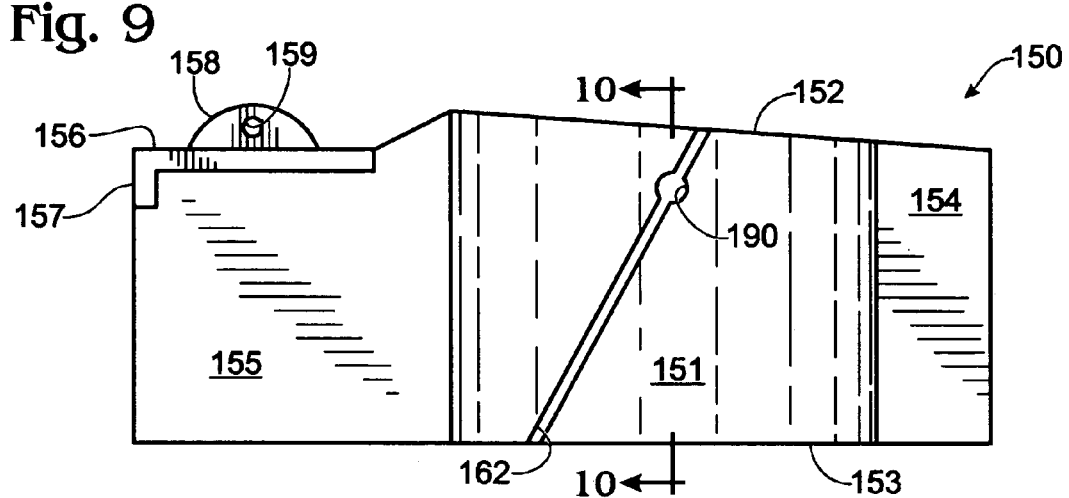
Fig. 9
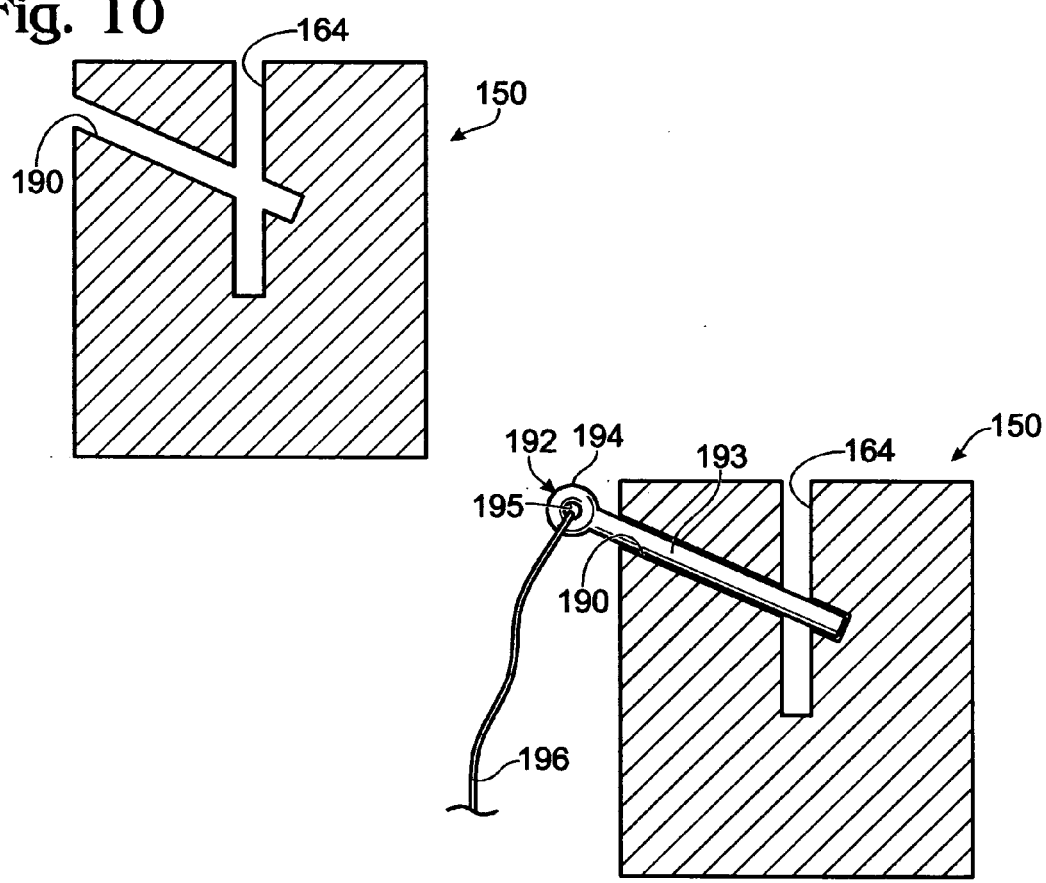
Fig. 10
Fig. 11

FISHING LINE CARRIER DEVICE FOR DOWNRIGGER FISHING

CROSS-REFERENCE TO RELATED APPLICATIONS

This is a continuation-in-part of application Ser. No. 10/754,165, filed Jan. 9, 2004 now abandoned.

BACKGROUND OF THE INVENTION

The present invention relates to a fishing line carrier device for downrigger fishing, and to a downrigger fishing setup employing the fishing line carrier device.

In conventional downrigger fishing, a heavy fishing line or thin wire cable (downrigger line) has a heavy weight (cannon ball) attached to its outer end. The cannon ball is lowered from the fishing boat into the water and down to a desired trolling depth. The cannon ball tends to keep the downrigger line substantially vertically disposed, even when trolling. A fishing line from a rod and reel is releasably attached to the cannon ball. When a fish strikes, the force of the strike causes the fishing line to be released from the cannon ball, and the fish is played and reeled in. The cannon ball must then be reeled into the boat to reattach the fishing line for the next try.

An improvement in this apparatus is described in U.S. Pat. No. 4,750,288. In the device described in this patent a fishing line carrier weight 30 is slipped onto the downrigger cable 22 with the fishing line 38 from a rod and reel being releasably clamped to the line carrier weight 30. The fishing line carrier weight is then lowered down the downrigger cable 22 until it reaches the desired trolling depth, which is a depth above the depth of the trolling weight (cannon ball) 24. When a fish strikes the lure 40, the fishing line 38 is released from line carrier weight 30 which then slides down downrigger cable 22 until it abuts trolling weight 24. When it is desired to resume fishing, another line carrier weight 30 is slipped onto downrigger cable 22 and the fishing line 38 releasably attached thereto. This allows several fishing cycles to be accomplished prior to reeling in the trolling weight 24. However, the design of carrier weight 30 allows it to easily slip off cable 22 after release from the fishing line 38.

The present invention provides an improved fishing line carrier device for downrigger fishing.

SUMMARY OF THE INVENTION

The present invention relates to a fishing line carrier device for use in downrigger fishing. The device includes a main body portion having a top and bottom, front and rear ends, and an outer surface. A bow extends from the front end of the body. A tail extends from the rear end of the body, the tail including a vertical stabilizer and a horizontal stabilizer. The horizontal stabilizer has a short flap extending downwardly at an angle of about 90 degrees from the trailing edge of the horizontal stabilizer. A bore extends vertically through the body along a vertically disposed central plane extending from the bow to the tail. A diagonally extending slot extends from the outer surface of the body to the central plane. Upper and lower access slots extend from the diagonally extending access slot to the bore.

During use a fishing line is attached to a downrigger line by means of a short leader extending from the carrier device to a releasable clamp attached to the fishing line. The downrigger line is inserted fully into the diagonally extending access slot of the carrier device, and the carrier device rotated slightly to allow the downrigger line to enter the bore via the upper and lower access slots. The downrigger line passes vertically through the bore, thereby allowing the carrier device to easily slide up and down the downrigger line as the fisherman reels in or lets out fishing line to raise or lower the depth of a lure attached to the outer end of the fishing line. After the carrier device is fully placed onto the downrigger line and the carrier device subjected to the flow of water caused by the boat moving forward during trolling, the downrigger line cannot communicate with the diagonally extending slot, and, therefore, the carrier device cannot slip off the downrigger line.

When a fish takes the lure the force of the strike causes the fishing line to be released by the clamp, and the carrier device slides down the downrigger line, preferably into abutment with the upper surface of a docking member which is in abutment with the upper surface of a downrigger weight. The fishing line can be reattached to the downrigger line with second and subsequent carrier devices, and the trolling operation repeated without having to pull in the downrigger line after every strike.

BRIEF DESCRIPTION OF THE DRAWINGS

FIG. 2 is a right side perspective view of the fishing line carrier device of the present invention;

FIG. 3 is a top plan view of the fishing line carrier device of the present invention;

FIG. 4 is a bottom plan view of the fishing line carrier device of the present invention;

FIG. 9 is a right side elevation view of a second embodiment of the fishing line carrier device of the present invention;

FIG. 10 is a front elevational view taken along line 10—10 of FIG. 9; and FIG. 11 is the front elevational view of FIG. 10 but showing a locking pin positioned within the locking pin receiving tunnel.

DESCRIPTION OF PREFERRED EMBODIMENTS

Figure 1:
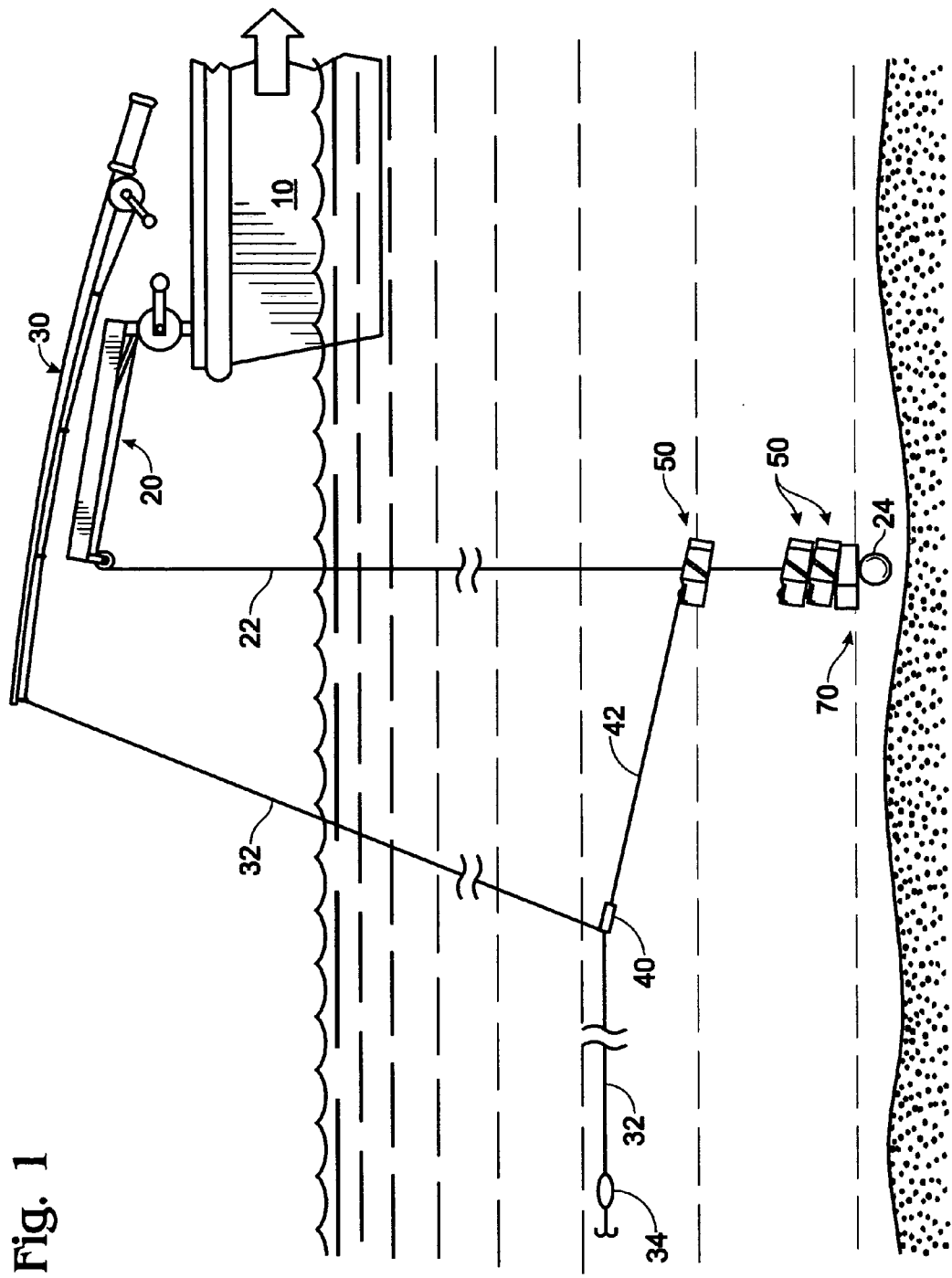
FIG. 1 is a side elevation of a downrigger fishing setup.

The overall downrigger fishing setup is shown in FIG. 1. The setup includes a boat 10 (only the stern of which is shown) being propelled in the direction of the arrow. A downrigger assembly 20 is located adjacent the stern of boat 10. Downrigger assembly 20 can be any conventional downrigger assembly, and includes a downrigger line 22 and a downrigger weight (cannon ball) 24.

A rod and reel assembly 30 is operated by a fisherman (not shown). A fishing line 32 extends downwardly from the rod tip of rod and reel assembly 30. A fish attractant 34 (such as a lure or live bait) is attached to the trailing end of fishing line 32.

A releasable clamp 40 is attached to a first end of a short attachment line 42 and clamp 40 releasably attached to fishing line 32 at a suitable distance from lure 34. Clamp 40 can be any releasable clamp employed in downrigger fishing. A preferred clamp is one described in U.S. Pat. No. 4,698,933.

Short attachment line 42 is attached at its second end to ear 58 of fishing line carrier device 50 through attachment hole 59.

Details of fishing line carrier device 50 are shown in FIGS. 2–6. Device 50 has a bulbous main body portion 51 having a substantially flat top 52 and a substantially flat bottom 53. Top 52 slopes downwardly from the rear end of main body portion 51 to the leading edge of bow 54, preferably at an angle of about 6 degrees.

A substantially V-shaped bow 54 extends forward from the front end of main body portion 51.

A tail section (fin) extends rearwardly from main body portion 51, and includes a vertical stabilizer 55 and a horizontal stabilizer 56. Horizontal stabilizer 56 preferably sits atop vertical stabilizer 55, as shown, although it could be located at the bottom or a mid-portion thereof. A flap 57 extends downwardly a short distance from the trailing (rear) edge of horizontal stabilizer 56, preferably at an angle of about 90 degrees. During trolling flap 57 causes the trailing end of carrier device 50 to be raised above its leading end, thereby causing downrigger line 22 to enter and exit bore 60 at an angle, which prevents carrier device 50 from accidentally slipping off downrigger line 22 and helps hold carrier device 50 in position on downrigger line 22. Flap 57 maintains this raised rear end configuration after carrier device 50 has been released from fishing line 32 and is sliding down downrigger line 22. In addition, flap 57 slows the descent of carrier device 50 down the downrigger line 22 after it has been released from fishing line 32.

Figure 5:
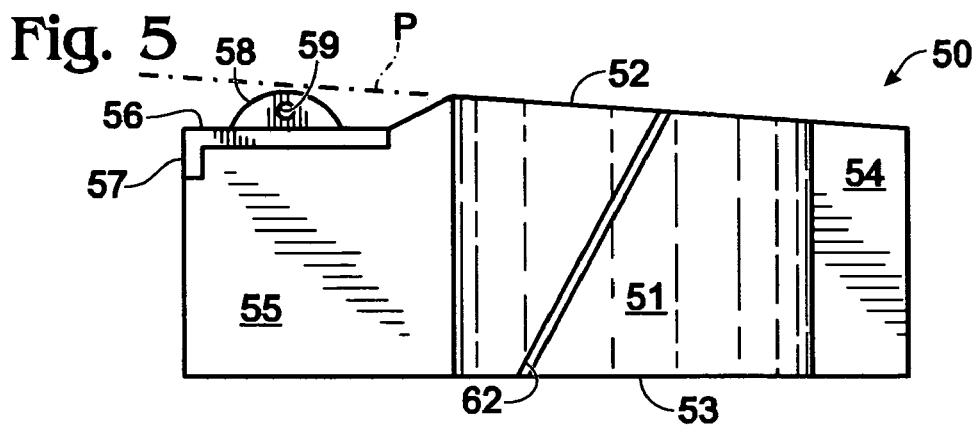
FIG. 5 is a right side elevation view of the fishing line carrier device of the present invention.

An attachment ear 58, having an attachment hole 59, extends above the upper surface of horizontal stabilizer 56 a height that is less than the rearwardly extended plane of sloping top 52 of main body portion 50 (designated as "P" in FIG. 5).

Vertical stabilizer 55 extends from the rear end of bottom 53 of the main body portion 51 of carrier device 50 to a position adjacent to, but removed from, the rear end of top 52. The space between the top 52 of main body portion 51 of carrier device 50 and the top of horizontal stabilizer 56, together with the slope of the top 52 of main body portion 51, prevents contact between the bottom 53 of carrier device 50 and the ear 58 of an adjacent carrier when the carriers 50 come into contact after having been released from fishing line 32.

Carrier device 50 must be weighty in order to carry a fishing line to its desired depth, and is preferably molded as a single piece of brass, lead or a lead alloy.

Figure 6:
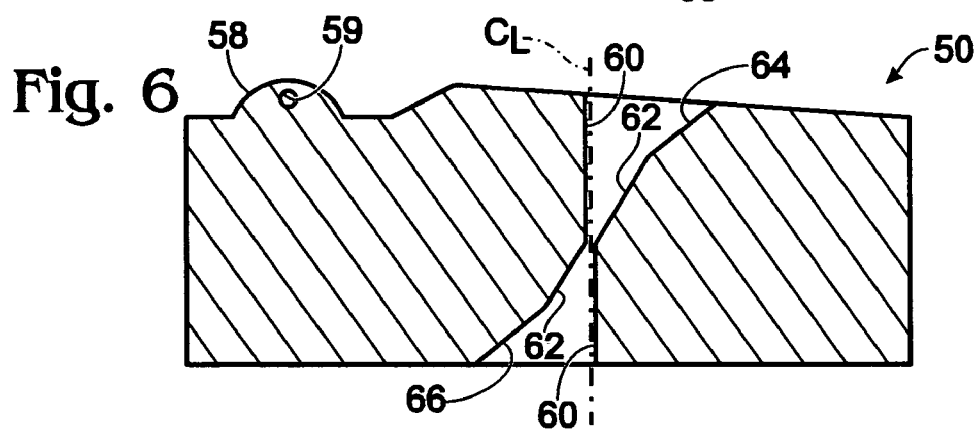
FIG. 6 is a cross-sectional view taken along line 6—6 of FIG. 3.

As best seen in FIG. 6, a bore 60 passes vertically through a rearward portion of main body portion 51 of carrier device 50. Bore 60 is located along the imaginary vertically disposed central plane that passes through carrier device 50, extending from the center of V-shaped bow 54 to the center of vertical stabilizer 55, i.e., line 6—6 of FIG. 3. Bore 60 has a diameter slightly greater than that of downrigger line 22. Bore 60 is located slightly in front of the center of gravity of carrier device 50.

A diagonally extending access slot 62 extends from the outer wall of main body portion 51 to the central plane passing through bore 60. Upper access slot 64 and lower access slot 66 are located along the central plane of carrier device 50, each extending from bore 60 and ending at a point slightly beyond diagonally extending slot 62. Upper and lower access slots 64 and 66 communicate diagonally extending access slot 62 with bore 60.

During use, a fishing line 32 is releasably attached to a downrigger line 22 by means of short leader 42 attached at its leading end to opening 59 of ear 58 of carrier device 50, and attached at its trailing end to releasable clamp 40 attached to the fishing line 32. Downrigger line 22 is inserted fully into diagonally extending access slot 62 and carrier device 50 rotated slightly to allow the downrigger line to enter bore 60 via upper and lower access slots 64 and 66. Downrigger line 22 passes vertically through bore 60, thereby allowing carrier device 50 to slide up and down downrigger line 22 as the fisherman reels in or lets out fishing line to raise or lower the depth of lure 34. After the carrier device 50 is fully placed onto the downrigger line 22, the downrigger line does not easily communicate with the diagonally extending access slot 62, especially during trolling, and, therefore, the carrier device 50 cannot slip off the downrigger line 22.

When a fish takes the lure 34, the force of the strike causes fishing line 32 to be released by clamp 40, and carrier device 50 slides down downrigger line 22 until its bottom 53 comes into abutment with the upper surface of downrigger weight 24 or with the top 52 of a previously released carrier device 50. Preferably a docking platform 70 is employed to receive the first released carrier device 50, as shown in FIG. 1. After the fish is netted or lost, fishing line 32 can be reattached to the downrigger line 22 with a second device 50 and trolling continued. Up to four or five carrier devices 50 can be used before the downrigger line 22 is reeled in to remove the carrier devices.

Figure 7:
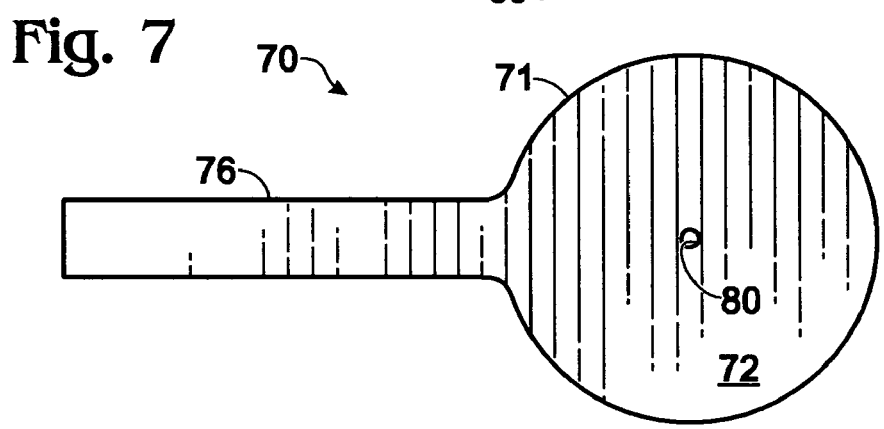
FIG. 7 is a top plan view of the docking platform.
Figure 8:
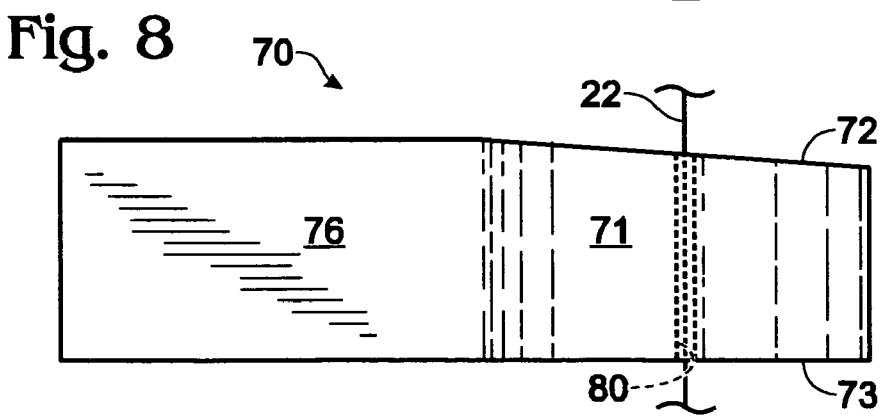
FIG. 8 is a left side elevation view of the docking platform.

In an alternative embodiment, a docking platform 70 (see FIGS. 1, 7 and 8) is attached to downrigger line 22 and rests in abutment with the top of downrigger weight 24. Docking platform 70 has a substantially cylindrical main body portion 71 having a substantially flat top 72 and a substantially flat bottom 73. Top 72 slopes downwardly from the rear (trailing) end to the front (leading) end of main body portion 71, preferably at an angle of about 6 degrees. A tail section consisting of a vertical stabilizer 76 extends rearwardly from main body portion 71. Vertical stabilizer 76 extends from the rear end of bottom 73 of the main body portion 71 of docking platform 70 to the rear end of its top 72. Vertical stabilizer 76 of docking platform 70 and vertical stabilizer 55 of carrier device 50 are in alignment during trolling.

A downrigger line bore 80 passes vertically through the axis of main body portion 71, and downrigger line 22 is passed therethrough and attached to downrigger weight 24.

The purpose of docking platform 70 is to provide an upper surface or top 72 which slopes downwardly from its trailing end to its leading end, which, when the bottom 53 of a first carrier device 50 comes into abutment therewith, causes the substantially flat bottom 53 thereof to be tilted to the angle of top 72. This causes downrigger line 22 to become angled at its entrance into and exit from bore 60 of carrier device 50, thereby locking downrigger line 22 within bore 60 to further assure that the first and subsequent carrier devices 50 cannot be accidentally knocked off downrigger line 22. Since vertical stabilizer 76 of docking platform 70 and vertical stabilzer 55 of carrier device 50 are in alignment during trolling, this results in proper alignment of the upper surface or top 72 of docking platform 70 and the bottom 53 of carrier device 50 for the purpose just discussed, as shown in FIG. 1.

FIGS. 9–11 illustrate a fishing line carrier device 150 including a fishing line locking mechanism to further prevent accidental access of the fishing line to the diagonal access slot. In FIGS. 9–11, elements identical to the elements of fishing line carrier device 50 have the same reference numbers but increased by 100. Thus, fishing line carrier device 150 includes a bulbous main body portion 151 having a substantially flat top 152 and a substantially flat bottom 153. Top 152 slopes downwardly from the rear end of main body portion 151 to the leading edge of bow 154, preferably at an angle of about 6 degrees.

A substantially V-shaped bow 154 extends forward from the front end of main body portion 151.

A tail section (fin) extends rearwardly from main body portion 51, and includes a vertical stabilizer 155 and a horizontal stabilizer 156. Horizontal stabilizer 156 preferably sits atop vertical stabilizer 155, as shown, although it could be located at the bottom or a mid-portion thereof. A flap 157 extends downwardly a short distance from the trailing (rear) edge of horizontal stabilizer 156, preferably at an angle of about 90 degrees.

An attachment ear 158, having an attachment hole 159, extends above the upper surface of horizontal stabilizer 156 a height that is less than the rearwardly extended plane of sloping top 152 of main body portion 150.

Fishing line carrier device 150 is identical to fishing line carrier device 50 except that it has a locking pin receiving tunnel 190 extending from the outer surface of main body portion 151 along diagonally extending access slot 162 and past the vertically disposed central plane of carrier device 50. Locking pin receiving tunnel 190 extends downwardly at an angle to the horizontal, preferably about 10 degrees.

A locking pin 192 is adapted to be tightly received by locking pin receiving tunnel 190, as shown in FIG. 11. Locking pin 192 has a cylindrical main body portion 193 and an outer head 194. Outer head 194 has an opening 195 extending therethrough. A first end of line 196 is secured to outer head 194 through opening 195. The other end of line 196 can be secured to attachment hole 159 of attachment ear 158 to prevent loss thereof.

In use, after fishing line 32 is secured within carrier device 150, locking pin 192 is inserted into locking pin receiving tunnel 190. Locking pin 192 prevents fishing line 32 from being able to enter diagonal access slot 162.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A fishing line carrier device for use in downrigger fishing comprising:
   a main body portion having a top, bottom, front and rear sides, and an outer surface;
   a bow extending from the front of said main body portion;
   a tail extending from the rear of said main body portion, said tail including a vertical stabilizer and a horizontal stabilizer having a trailing edge;
   said carrier device having a vertically disposed central plane extending from said bow to said tail;
   a bore extending vertically through said main body portion along said central plane and adapted to slidably receive a downrigger line;
   a diagonally extending access slot extending from the outer surface of said body to said central plane;
   an upper access slot extending from the upper half of said diagonally extending slot to said bore; and
   a lower access slot extending from the lower half of said diagonally extending slot to said bore;
   said upper and lower access slots communicating said diagonally extending access slot with said bore, said diagonally extending, upper, and lower access slots being adapted to receive said downrigger line and allow said downrigger line to be positioned within said bore.

2. The carrier device of claim 1 wherein said horizontal stabilizer sits atop said vertical stabilizer.

3. The carrier device of claim 2 including a flap extending downwardly from said trailing edge of said horizontal stabilizer.

4. The carrier device of claim 1 including a locking pin receiving tunnel extending from said outer surface of said main body portion along said diagonally extending access slot and past said vertically disposed central plane, said locking pin receiving tunnel adapted to receive a locking pin after said carrier device is positioned onto a downrigger line.

5. The carrier device of claim 4 wherein said locking pin receiving tunnel extends downwardly at an angle to the horizontal.

6. The carrier device of claim 5 wherein said angle is about 10 degrees.

7. A downrigger fishing setup comprising:
   a boat proceeding at trolling speed in a body of water, said boat having downrigger line means including a downrigger line attached to a downrigger weight at its outer end, said downrigger weight being positioned in the water:
   a fishing line extending from a fishing rod located on said boat, said fishing line having a fish attractant attached to its outer end, said fishing line and fish attractant being positioned in the water behind said downrigger line;
   a docking platform having a main body portion and a vertical stabilizer extending rearwardly from said main body portion, said downrigger line passing through a vertical bore in said main body portion;
   a fishing line carrier device slidably positioned on said downrigger line above said docking platform, said fishing line carrier device comprising:
   a main body portion having a top, bottom, front and rear sides, and an outer surface;
   a bow extending from the front of said main body portion;
   a tail extending from the rear of said main body portion, said tail including a vertical stabilizer and a horizontal stabilizer having a trailing edge;
   said carrier device having a vertically disposed central plane extending from said bow to said tail;
   a bore extending vertically through said main body portion along said central plane and adapted to slidably receive a downrigger line;
   a diagonally extending access slot extending from the outer surface of said body to said central plane;
   an upper access slot extending from the upper half of said diagonally extending slot to said bore; and
   a lower access slot extending from the lower half of said diagonally extending slot to said bore;
   said upper and lower access slots communicating said diagonally extending access slot with said bore, said diagonally extending, upper, and lower access slots adapted to receive said downrigger line and allow said downrigger line to be positioned within said bore; and
   an attachment line attached at a first end to said fishing line carrier and extending between said fishing line carrier and said fishing line, said line being releasably attached at a second end to said fishing line.

8. The downrigger fishing setup of claim 7 wherein said horizontal stabilizer sits atop said vertical stabilizer.

9. The downrigger fishing setup of claim 8 including a flap extending downwardly from said trailing edge of said horizontal stabilizer.

10. The downrigger fishing setup of claim 7 including a locking pin receiving tunnel extending from said outer surface of said main body portion along said diagonally extending access slot and past said vertically disposed central plane, said locking pin receiving tunnel adapted to receive a locking pin after said carrier device is positioned onto a downrigger line.

11. The downrigger fishing setup of claim 10 wherein said locking pin receiving tunnel extends downwardly at an angle to the horizontal.

12. The downrigger fishing setup of claim 11 wherein said angle is about 10 degrees.

13. The downrigger fishing setup of claim 7 wherein said main body portion of said docking platform is substantially cylindrical and has a substantially flat top and a substantially flat bottom, said top sloping downwardly from its trailing end to its leading end.

14. The downrigger fishing setup of claim 13 wherein said docking platform has a vertical stabilizer extending rearwardly from said main body portion.

15. A fishing line carrier device for use in downrigger fishing comprising:
a main body portion having a top, bottom, front and rear sides, and an outer surface;
a bow extending from the front of said main body portion;
a tail extending from the rear of said main body portion, said tail including a vertical stabilizer and a horizontal stabilizer having a trailing edge, said horizontal stabilizer sitting atop said vertical stabilizer;
said carrier device having a vertically disposed central plane extending from said bow to said tail;
a bore extending vertically through said main body portion along said central plane;
a diagonally extending access slot extending from the outer surface of said body to said central plane;
an upper access slot extending from the upper half of said diagonally extending slot to said bore; and
a lower access slot extending from the lower half of said diagonally extending slot to said bore;
said upper and lower access slots communicating said diagonally extending access slot with said bore.

16. The carrier device of claim 15 including a flap extending downwardly from said trailing edge of said horizontal stabilizer.

17. A downrigger fishing setup comprising:
a boat proceeding at trolling speed in a body of water, said boat having downrigger line means including a downrigger line attached to a downrigger weight at its outer end, said downrigger weight being positioned in the water;
a fishing line extending from a fishing rod located on said boat, said fishing line having a fish attractant attached to its outer end, said fishing line and fish attractant being positioned in the water behind said downrigger line;
a docking platform having a main body portion and a vertical stabilizer extending rearwardly from said main body portion, said downrigger line passing through a vertical bore in said main body portion;
a fishing line carrier slidably positioned on said downrigger line above said docking platform, said fishing line carrier having
a main body portion having a top, bottom, front and rear sides, and an outer surface;
a bow extending from the front of said main body portion;
a tail extending from the rear of said main body portion, said tail including a vertical stabilizer and a horizontal stabilizer having a trailing edge, said horizontal stabilizer sitting atop said vertical stabilizer;
said carrier device having a vertically disposed central plane extending from said bow to said tail;
a bore extending vertically through said main body portion along said central plane;
a diagonally extending access slot extending from the outer surface of said body to said central plane;
an upper access slot extending from the upper half of said diagonally extending slot to said bore; and
a lower access slot extending from the lower half of said diagonally extending slot to said bore;
said upper and lower access slots communicating said diagonally extending access slot with said bore; and
an attachment line attached at a first end to said fishing line carrier and extending between said fishing line carrier and said fishing line, said line being releasably attached at a second end to said fishing line.

18. The downrigger fishing setup of claim 17 including a flap extending downwardly from said trailing edge of said horizontal stabilizer.

* * * * *